Dec. 3, 1929.  E. KOGBETLIANTZ  1,737,660

THREE-WEIGHTED TORSION BALANCE

Filed May 31, 1927

E. Kogbetliantz INVENTOR

By: Marks & Clerk
Attys.

Patented Dec. 3, 1929

1,737,660

UNITED STATES PATENT OFFICE

ERVAND KOGBETLIANTZ, OF PARIS, FRANCE

THREE-WEIGHTED TORSION BALANCE

Application filed May 31, 1927, Serial No. 195,547, and in France June 14, 1926.

The two-weighted torsion balance of Coulomb modified by Eötvös is beginning to play an important part for geological survey because its use often does away with the very expensive drilling work required.

In order to discover the structure of underlying formations with a torsion balance, curves connecting points where the vertical component of gravity is the same are traced. This vertical component is calculated by ascertaining the increase of the component from one point to another distant therefrom by one centimeter for instance, this increase being calculated from the data given by the balance during the observations made at each point.

At each point it is sufficient to determine the values of the gradients of gravity $$\frac{d^2U}{dxdz} \text{ and } \frac{d^2U}{dydz},$$

U being the potential function of gravity and $x$, $y$, $z$ the coordinates measured respectively from a common origin towards the north, the east and downwards along the vertical.

The torsion balances now used comprise two straight beams disposed next to each other and each supported by comparatively rigid torsion wires of platinum-iridium alloy hanging from two neighboring points. Each beam bears at one end a mass and from the other end of each beam hangs a wire to which is secured an equal mass at a certain distance below the beam.

Unfortunately such balances only give the magnitudes $$\frac{d^2U}{dxdz} \text{ and } \frac{d^2U}{dydz}$$

together with the other derivative functions $$\frac{d^2U}{dxdy} \text{ and } \frac{d^2U}{dy^2}-\frac{d^2U}{dx^2}.$$

Therefore it is necessary, when it is desired to obtain $$\frac{d^2U}{dxdz} \text{ and } \frac{d^2U}{dydz}$$

to solve a system of linear equations of the first order with four unknowns which are the four derivative functions designed by the following symbols $$U_{xz}=\frac{d^2U}{dxdz} \quad U_{yz}=\frac{d^2U}{dydz} \quad U_{xy}=\frac{d^2U}{dxdy}$$

$$U_D=\frac{d^2U}{dy^2}-\frac{d^2U}{dx^2}$$

As the well known theory of torsion balances proves, the following is the equation of equilibrium for one beam directed in the azimuth A $$T=\frac{1}{2}\frac{K}{t}(U_D \sin 2A + 2U_{xy}\cos 2A) + \frac{mhl}{t}(U_{yz}$$

$\cos A - U_{xz}\sin A)$

T being the angular displacement of the beam, $m$ the mass secured to the ends of each beam, $h$ the difference in height of the masses $m$ of each beam, $2l$ the length of the beam and $t$ the coefficient of torsion of the platinum wire. K is the moment of inertia of the whole (beam and masses) with reference to the axis of the platinum wire (see Ambronn's work "Methoden der angewandten Geophysik 1926", page 20). The zero of the scale varies by reason of the variations in temperature; there are altogether five unknowns to wit: the zero of the scale of torsion and the four abovementioned derivative functions. Therefore a balance with only one beam requires in each point at least five observations in five different azimuths.

With two beams as commonly used in torsion balances three observations would give six equations allowing to determine the six unknowns $U_{xy}$, $U_{yz}$, $U_{xz}$, $U_D$ and the two zeros of the scales corresponding to the two torsion wires. In practice four observations are necessary in view of obtaining an extra control equation.

Due to the interference of the two superfluous unknowns $U_{xy}$ and $U_D$ the number of observations at each point must necessarily be increased whereby the accuracy of the measurements is diminished.

These serious drawbacks are intrinsic drawbacks of the beam with two masses used exclusively up till now in torsion balances, as they are due to the number of masses which is the same in all forms of execution of such apparati (Schweydar-Bamberg, Süss, Hecker, Oerfling, Haalek balances and the like).

Now I remove these drawbacks by using beams provided with $n$ equal masses, $n$ being superior to 2, secured to or hanging from the ends of $n$ arms of equal length forming together a star-beam showing $n$ arms disposed symmetrically round its suspension point. The $n$ masses are secured to or hang from the beam at different heights $h, h_2 \ldots h_n$ below the ends of the corresponding arms thereof.

The equation of equilibrium of such a beam contains only the unknowns $U_{xz}$ and $U_{yz}$. The most simple case and the easiest to execute is that shown on appended drawings by way of example and wherein $n=3$.

Figure 1:
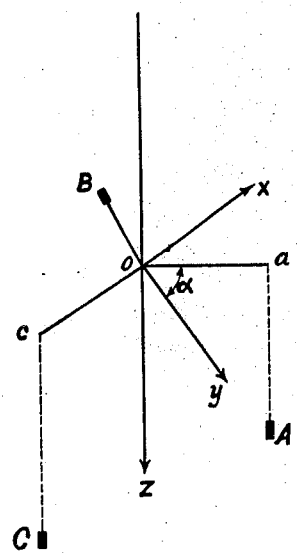
Fig. 1 is a diagrammatical view of a one-beam torsion balance according to my invention.
Figure 3:
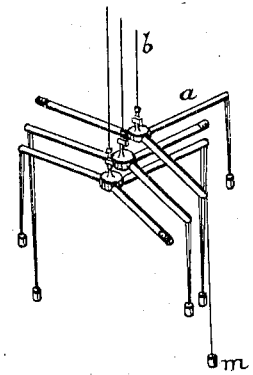
Fig. 3 shows the same balance as executed in practice.

In this balance each beam is formed by three horizontal rods $$\overline{Oa}\ \overline{OB}\ \overline{Oc}$$

of equal length $l$, secured symmetrically to the suspension point of the beam. Three equal masses $m$ are secured to or hang from the apices $a$, B, $c$ of the equilateral triangle formed by the three ends of the three rods of the beam. I will term $U_x^2$ and $U_y^2$ respectively the derivative functions $$\frac{d^2U}{dx^2} \text{ and } \frac{d^2U}{dy^2}.$$

As shown on the drawing the mass B may be secured directly to the beam, the mass A may hang at a distance $\overline{aA}=h$ below the end $a$ of the corresponding rod and the weight C may hang at a distance $\overline{cC}=2h$ below the end $c$ of the corresponding rod.

The beam hangs by means of a substantially rigid wire having a coefficient of torsion equal to $t$.

It is easy to calculate the projections on the axes $ox$ and $oy$ of the forces of gravity applied to the masses A, B and C.

The force applied to point A has respectively for projections $$ml \cos A\ U_x^2 + ml \sin A\ U_{\cdot y} + mh\ U_{xz}$$

and $$ml \cos A\ U_{xy} + ml \sin A\ U_y^2 + mh\ U_{zy}$$

They are for point B:

$$ml \cos (A+120°)\ U_x^2 + ml \sin (A+120°)\ U_{xy}$$

and $$ml \cos (A+120°)\ U_{xy} + ml \sin (A+120°)\ U_y^2$$

and for point C:

$$ml \cos (A-120°)\ U_x^2 + ml \sin (A-120°)\ U_{xy} + 2mh\ U_{xz}$$

and $$ml \cos (A-120°)\ U_{xy} + ml \sin (A-120°)\ U_y^2 + 2mh\ U_{yz}$$

Thus their moments with reference to the vertical axis OZ are for A:

$$ml^2 \cos 2A\ U_{xy} + \frac{1}{2} ml^2 \sin 2A\ U_D + mhl\ (U_{yz} \cos A - U_{xz} \sin A)$$

for B:

$$ml^2 \cos (2A+240°)\ U_{xy} + \frac{1}{2} ml^2 \sin (2A+240°)\ U_D$$

and for C:

$$ml^2 \cos (2A-240°)\ U_{xy} + \frac{1}{2} ml^2 (\sin (2A-240°)\ U_D + 2mhl\ [U_{yz} \cos (A-120°) - U_{xz} \sin (A-120°)]$$

Adding these values together, I obtain after simplification the total moment N.

$$N = mlh \sqrt{3}\ (U_{xz} \cos A + U_{yz} \sin A).$$

The equation of equilibrium for a beam directed in the azimuth A is $$\frac{d^2U}{dxdz} \cos A + \frac{d^2U}{dydz} \sin A = \frac{t.T}{mlh \sqrt{3}}$$

T being the angular displacement of the beam and $t$ the coefficient of torsion of the suspension wire; with one single beam provided with three masses there are three unknowns: $U_{xz}$, $U_{yz}$ and the position of the zero of the scale. Therefore four observations are necessary including one for a control equation.

By increasing the number of beams the number of observations necessary in one point is reduced.

Figure 2:
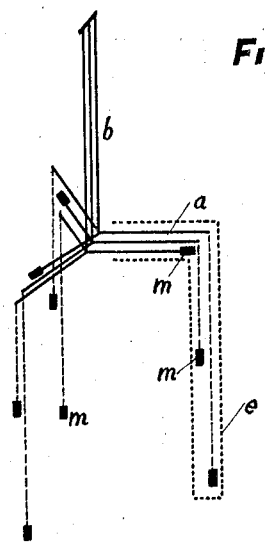
Fig. 2 is a similar view of a three-beam torsion balance of the same type.

For instance I may use the balance shown on Fig. 2 provided with three identical beams each showing 3 divergent rods and three masses. These beams $a$ hang from three suspension wires $b$ disposed next to each other in such a manner that the three equal masses $m$ borne by the adjacent ends of three arms belonging to three distinct beams are at different levels. Of course these groups of three masses are contained as usual in a vertical tube *e* in view of eliminating any perturbations from outside.

Two observations made with such a balance in two different azimuths are sufficient for ascertaining the values of $$\frac{d^2U}{dxdz} \text{ and of } \frac{d^2U}{dydz}$$

at the point considered whereas as explained hereinabove, four measurements are necessary with Eötvös's balance. The number of unknowns is five ($U_{xz}$, $U_{yz}$ and the positions of the three zeros corresponding to the three beams) and as each measurement provides three equations, the six equations obtained by two observations are sufficient for ascertaining the unknowns, one equation serving as a control equation.

As to the execution of such a balance, it is entirely similar to the usual Eötvös's balance with two weights. I prefer though to replace the stationary plate in the usual automatic photographic recording method by a very slowly continuously moving plate. This allows not only the stationary luminous spot corresponding to the equilibrium of each beam to be photographed, but also the continuous curve (a damped sinusoid) which corresponds to the oscillations of the beam so as to ascertain the position of equilibrium by the mean position of the spot between a number of couples of positions corresponding to the extreme elongations.

What I claim is:

1. A torsion balance comprising a suspension wire, a beam constituted by more than two horizontal rods secured together angularly spaced by equal amounts one with reference to the other and starting radially from the lower end of the suspension wire and equal masses equal in number to the rods and means whereby the masses are secured to the end of the corresponding rods and at a vertical distance therefrom different for each mass.

2. A torsion balance comprising a suspension wire, a beam constituted by three rods secured together angularly spaced by equal amounts one with reference to the other and starting radially from the lower end of the suspension wire three equal masses and means whereby the masses are secured to the end of the corresponding rods and at vertical distance therefrom different for each mass.

3. A multiple torsion balance constituted by a plurality of suspension wires hanging side by side, similar beams hanging from each suspension wire and each constituted by more than two rods secured together angularly spaced by equal amounts one with reference to the other and starting radially from the lower end of the corresponding suspension wire and equal masses the number of which is equal to the total number of rods and means whereby the masses hang freely from the end of the corresponding rods the vertical distance between each mass and the beam from which it hangs being different according to the rod considered.

In testimony whereof I have affixed my signature.

ERVAND KOGBETLIANTZ.